United States Patent

[11] 3,603,955

| [72] | Inventors | Donald Levy<br>Spring Valley;<br>Tibor Rusz, Kingston, both of, N.Y. |
|---|---|---|
| [21] | Appl. No. | 804,389 |
| [22] | Filed | Mar. 5, 1969 |
| [45] | Patented | Sept. 7, 1971 |
| [73] | Assignee | Donti Research Development<br>Manufacturing<br>Monsey, N.Y. |

[54] MINUTE VOLUME ALARM EQUIPMENT
2 Claims, 1 Drawing Fig.

[52] U.S. Cl. .................................................. 340/239 R, 128/2.08
[51] Int. Cl. .............................................. G08b 21/00
[50] Field of Search ............................................ 340/236, 239, 213, 279; 128/2.08, 2.1, 2

[56] References Cited
UNITED STATES PATENTS
3,277,458  10/1966  Greenwood .................. 340/248 X
3,347,223  10/1967  Pacela .......................... 128/2.08 X
3,433,217  3/1969   Rieke ........................... 128/2.08
3,469,112  9/1969   Hands et al. .................. 330/35 UX FOREIGN PATENTS
874,197   7/1942   France ......................... 340/239

Primary Examiner—John W. Caldwell
Assistant Examiner—Daniel Myer
Attorney—Frederick W. Padden ABSTRACT: Minute volume alarm equipment for monitoring the flow of gas and producing an alarm when the gas volume falls without a prescribed range is disclosed. The equipment includes a high input impedance monitor amplifier which senses analog electrical signals in a minute volume indicator. These signals are amplified by a differential amplifier and then coupled through a low output impedance buffer amplifier to low and high limit detectors. When the minute volume falls without the range defined by these limits an alarm amplifier is operated to activate an alarm device.

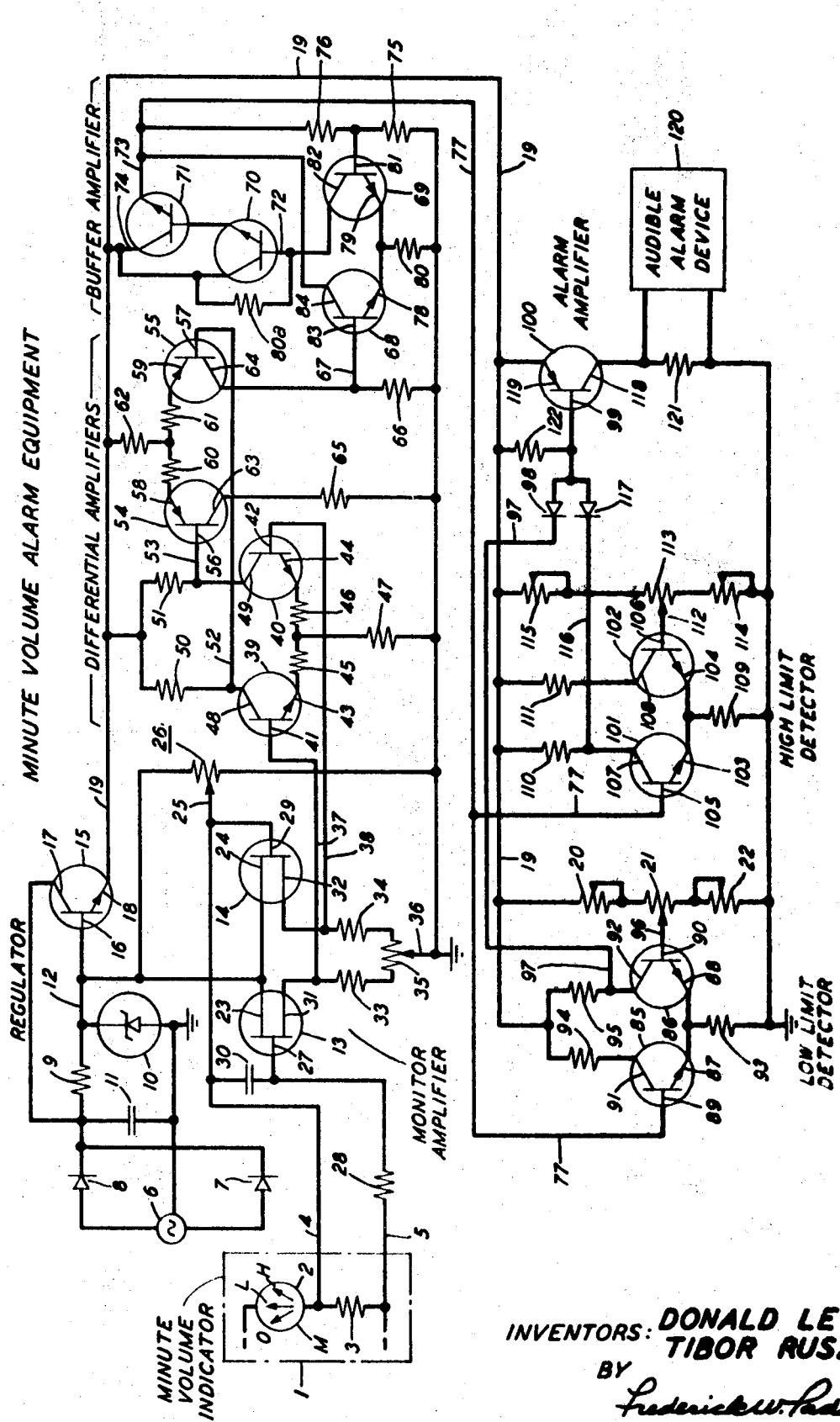

3,603,955

MINUTE VOLUME ALARM EQUIPMENT

BACKGROUND OF THE INVENTION

This invention relates to equipment for monitoring the flow of gas and, more particularly, to facilities for monitoring the volumes of measured gas flow supplied illustratively in medical applications to patients in order to detect when such volumes deviate from a predetermined value or range of values.

In numerous applications it is desirable to detect when the volume of gas flow deviates from a predetermined value or range of values and to produce an alarm when such deviation occurs in order to enable prompt corrective measures to be taken. For example, in hospital intensive care units considerable time is spent in monitoring the volume of gas (e.g. oxygen or anesthetics) supplied to a patient. An attendant, a nurse or a doctor, spends considerable time and effort monitoring the gas volume to insure that undesired or dangerous deviations above or below prescribed volumes do not occur. Such care is necessary, for example, to assist patient breathing in an artificial respirator. If the volume falls below a prescribed value the patient has insufficient ventilation, whereas if it increases above another prescribed value the patient may suffer serious effects of hyperventilation. It is therefore critical that the gas volume in this and similar applications be maintained within a range safe to the patient's health.

It is therefore a broad object of the present invention to monitor the flow of gas.

It is another object of this invention to measure the rate at which gas is supplied to a medical patient and to detect when the volume deviates from a predetermined value or range of values.

It is a further object of the present invention to provide an alarm when such deviation occurs.

In typical medical environments the analysis of the respiratory parameters of a patient, including minute volume inspiration or expiration, is made via spirometer instruments. A simple, compact and economic spirometer is disclosed in U.S. Pat. application Ser. No. 626,240 of applicants' filed on Mar. 27, 1967. The spirometer comprises a resistance measurement bridge having a transducer which utilizes resistance changes in a heated platinum wire to measure air flow. Electrical network circuits convert the measured air flow into signals which correspond to the air flow. A meter circuit is controlled by an averaging resistance-capacitor network and field-effect transistor (FET) arrangements for providing indications of the measured flow. The voltage across a resistor in the meter circuit is an analog representation of the minute flow, and it is this voltage which is sensed by the minute volume alarm equipment of the present invention.

It is consequently another object of this invention to provide an alarm in conjunction with a spirometer when the volume of gas supplied to a medical patient falls outside a prescribed range of values.

SUMMARY OF THE INVENTION

These and other objects are accomplished in an illustrative embodiment of the invention comprising a monitor amplifier which senses the volume analog electrical signals in a spirometer meter circuit. The monitor amplifier is typically an FET differential amplifier having a high input impedance so as not to load the meter circuit and to permit a controlled damping and response time of the alarm to the input signal. The analog signals are amplified by a dual stage differential amplifier employing conventional transistors, and are then coupled through a low output impedance Darlington-pair buffer amplifier to low and high limit detectors. The low input impedance insures that the detector limits are not adversely affected by loading. The detectors are typically differential amplifiers having one input at a fixed voltage to establish threshold voltages which are the analogs of the low and high minute volume limits. When the volume falls without the range defined by these limits an alarm amplifier is operated so as to activate an audible alarm device.

DESCRIPTION OF THE DRAWING

The foregoing and other objects, features and advantages of the present invention are more specifically understood from a reading of the following description of a specific, illustrative embodiment thereof with reference to the single sheet of drawing. The latter is a schematic depicting equipment for monitoring minute volumes of air or gas measured by a minute volume indicator 1 and for furnishing an alarm indication when the monitored volume of measured air or gas is outside of a prescribed settable range.

Minute volume indicator 1 is depicted in the drawing essentially in block form because its structural details are not part of the present invention. Our illustrative embodiment is advantageously utilized with a commercially available minute volume indicator manufactured by DONTI Research Development Manufacturing Corp. of Spring Valley, N. Y.

DETAILED DESCRIPTION

As shown in the drawing, the minute volume indicator 1 comprises a meter 2 and a resistor 3 which are part of the circuitry utilized for indicating on meter 2 the volumes of measured air or gas. According to our invention, an electrical signal representative of the measured minute magnitude of a fluid, air or gas, flow is derived across resistor 3 and is available on conductors 4 and 5 as an input signal for the minute volume alarm equipment.

For reasons of economy and simplicity, it has been found advantageous in certain cases to supply the alarm equipment as a separate accessory unit for the minute volume indicator. Accordingly, the alarm equipment of our invention is advantageously adaptable for use as an attachment on a so-called "plug-in" basis to the minute volume indicator. As a consequence, a plug connection (not shown) is made from resistor 3 to the conductors 4 and 5.

In the specific illustrative embodiment of our invention, AC (alternating current) power for operating the alarm equipment is shown as supplied from a source 6. The latter is connected to a full wave rectifier for conversion of the AC to DC (direct current) voltages for operating an associated transistor regulator and other transistor circuitry. The rectifier comprises diodes 7 and 8, resistor 9, a zener diode 10 and filter capacitor 11. As a result, diode 10 operates in its zener region to provide a regulated positive DC voltage on conductor 12 for biasing the field-effect transistors 13 and 14. The transistor voltage regulator comprises an NPN transistor 15 which includes: a base electrode 16 connected to a rectified positive potential on conductor 12, a collector electrode 17 connected to rectified positive AC voltage at a junction of resistor 9 and capacitor 11, and an emitter electrode 18 connected to conductor 19 which supplies a regulated voltage on conductor 19 for operating the other transistor circuitry. Transistor 15 acts as an emitter follower with a fixed low impedance output. The magnitude of the regulated voltage on conductor 19 is fixed by means of zener diode 10.

Field-effect transistors 13 and 14 form part of a differential amplifier which monitors input air and gas volume voltages received from minute volume indicator 1 over conductors 4 and 5 and which translates such voltages into signals for controlling succeeding transistor circuitry of the alarm equipment. Transistor 13 has a drain electrode 23 connected to the regulated positive DC voltage on conductor 12 while a drain electrode 24 on transistor 14 has a connection to the positive potential on conductor 12. The gate electrode 29 is connected via a wiper arm 25 and a resistance of potentiometer 26 to the same potential on conductor 12. A gate electrode 27 of transistor 13 is connected via resistor 28 to conductor 5 and a gate electrode 29 of transistor 14 is connected to conductor 4. Each such transistor advantageously provides a high input impedance for receiving input voltages on conductors 4 and 5 with negligible loading on minute volume indicator 1.

A resistor 28 and capacitor 30 network is serially connected across conductors 4 and 5 for dampening of the received voltage thereon. The network is used because the voltage excursion on conductors 4 and 5 is greater than the indication on meter 2 which is customarily mechanically damped and because the alarm equipment response is thus advantageously designed to coincide with the voltage readout on meter 2. A further consideration is the dampening of any voltages generated by the meter resulting from vibrations of the meter and its movements. Source electrodes 31 and 32 of transistors 13 and 14 are biased through respective resistors 33 and 34 and an amplifier balancing potentiometer 35 to ground supplied to its wiper 36. Accordingly, transistors 13 and 14 are operable for monitoring input signals on conductors 4 and 5 and, in response thereto, to supply output potential differences at the respective source electrodes 31 and 32 which are coupled over conductors 37 and 38 to drive the succeeding amplifier comprising NPN transistors 39 and 40.

The latter transistors provide a first differential amplifier with constant gain and negative feedback for stable output. Base electrodes 41 and 42 of transistors 39 and 40 receive respective input signals on conductors 37 and 38. Transistors 39 and 40 each have respective emitter electrodes 43 and 44 biased through respective resistors 45 and 46 and a common resistors 47. Resistors 45 and 46 are used for degenerative feedback. Collector electrodes 48 and 49 are connected through respective resistors 50 and 51 to the regulated positive potential on conductor 19. Accordingly, input signals on conductors 37 and 38 are amplified by transistors 39 and 40 and the amplified signals are coupled from collectors 48 and 49 over conductors 52 and 53 as input signals to a second differential amplifier including PNP transistors 54 and 55.

Constant gain and negative feedback are provided in the latter amplifier by connecting the input signals to respective base electrodes 56 and 57 of transistors 54 and 55 while the emitter electrodes 58 and 59 thereof are connected through respective resistors 60 and 61 and a common emitter resistors 62 to the positive potential on conductor 19. Collector electrodes 63 and 64 of transistors 54 and 55 are connected through resistors 65 and 66 to ground. Thus, input signals on conductors 52 and 53 are amplified by transistors 54 and 55 and an amplified signal available at collector 64 is conducted over conductor 67 as an input signal to the buffer amplifier comprising NPN transistors 68, 69, 70 and 71.

The buffer amplifier has a constant gain and a low output impedance. The latter ensures that input signal loading does not adversely affect the high and low limits established by detector amplifiers as hereinafter explained. Transistors 70 and 71 are arranged in a well-known Darlington configuration for stabilizing the combined gain of the transistors independently of ambient temperature changes and variations in the individual transistor gains. Transistors 70 and 71 may be referred to as having effectively a single base electrode 72, emitter electrode 73 and collector electrode 74. Collector 74 is connected to the positive voltage on conductor 19 via transistor 15. Emitter 73 is connected through resistors 75 and 76 to ground for forward biasing the emitter 73 and base 72 junction in cooperation with transistors 68 and 69. The latter comprise another part of the buffer amplifier which is responsive to input signals on conductor 67 for varying the emitter 73 and base 72 bias to produce on conductor 77 output signals that are compared by high and low limit comparator amplifiers.

Transistors 68 and 69 both have respective emitter electrodes 78 and 79 connected through resistor 80 to ground. Base electrode 81 of transistor 69 is connected to a voltage derived across resistor 75 and forward biases the emitter 79 to base 81 junction for providing at collector 82 of transistor 69 the base 72 signal drive for biasing transistors 70 and 71. Base electrode 83 of transistor 68 receives input signals on conductor 67 for controlling the forward bias of the base 83 to emitter 78 junction and accordingly the output signal derived across resistor 80 for forward biasing the emitter 79 to base 81 junction of transistor 69. The voltage at collector electrode 84 of transistor 68 is furnished by the emitter voltage of transistor 71. A resistor 80a is connected between the regulated voltage of conductor 19 and collector 82 of transistor 69. Accordingly, the transistors 68 and 69 operate to amplify the input signals on conductor 67 and to couple the amplified signal to the emitter 73 and base 72 of transistors 70 and 71 for producing an output signal on conductor 77 which is compared by the high and low limit detectors.

A low limit detector includes a pair of transistors 85 and 86 each of which has respective emitter 87, 88, base 89, 90 and collector 91, 92 electrodes. The emitters 87 and 88 are connected through a resistor 93 to ground. Collectors 91 and 92 are connected through resistors 94 and 95, respectively, to the positive potential on conductor 19. Base electrode 89 is connected to conductor 77 and is driven by output signals supplied thereto by the buffer amplifier. Base electrode 90 is connected to wiper 96 of a potentiometer 21 which forms part of a voltage divider including rheostats 20 and 22 that are serially connected between ground and the voltage on conductor 19. Wiper 96 is adjustable to supply a threshold voltage for forward biasing the base 90 emitter 88 junction of 86 and thereby setting a lower limit of a monitored minute volume of air or gas. Output signals from the lower limit detector coupled from the collector 92 of transistor 86 over conductor 97 and a diode 98 to a base electrode 99 of an alarm amplifier PNP transistor 100.

Similarly, a high level detector comprises a pair of transistors 101 and 102 each having respective emitter 103, 104, base 105, 106 and collector 107, 108 electrodes. Emitters 103 and 104 are connected through resistor 109 to ground. Collectors 107 and 108 are connected through resistors 110 and 111, respectively, to the positive voltage on conductor 19. Base 105 is connected to conductor 77 and is driven concurrently with the low limit detector by output signals supplied by the buffer amplifier. Base electrode 106 is connected to wiper 112 of potentiometer 113 which forms part of a voltage divider including rheostats 114 and 115 that are serially connected between ground and the voltage on conductor 19. Wiper 112 is adjustable to supply a threshold voltage for forward biasing the base 106 to emitter 104 junction of transistor 102 and thereby setting an upper limit of a monitored minute volume of gas or air. Output signals from the upper limit detector are coupled from collector 107 over conductor 116 and through diode 117 to the base 99 of alarm amplifier transistor 100.

A collector electrode 118 of transistor 100 is connected to an audible alarm indicating device 120 which is further connected in parallel with a resistor 121 to ground. An emitter electrode 119 of transistor 100 is connected to the positive potential on conductor 19. Bias voltage for base electrode 99 is derived through resistor 122 which is connected to the potential on conductor 19. In a quiescent no alarm state, transistor 100 is reverse biased. It is switched into an alarm state by negative potentials conducted through diodes 98 and 117 under control of the low and high level detectors.

Turning now to the dynamic operation of the alarm equipment, it is noted that its transistor circuitry employs DC direct-coupled logic and that the minute volume indicator 1 generates signals across its resistor 3 indicative of measured minute volume liter flow. Illustratively, resistor 3 corresponds to resistor 139 of FIG. 3 of our aforementioned copending patent application. Each signal derived across resistor 3 biases transistors 13 and 14 to translate the signal into output signals on conductors 37 and 38. As previously mentioned, the transistors 13 and 14 have high input impedances and therefore low loading effect on the minute volume indicator operation. The signals on conductors 37 and 38 are amplified by transistors 41, 42, 54 and 55 to produce an output signal on conductor 67 which biases the buffer amplifier transistors 68, 69, 70 and 71 for supplying to lead 77 output signals representing measured liter flow. The latter signals are then compared by the low and high limit detectors with respective limits set by potentiometers 21 and 113 for controlling the alarm amplifier and audible alarm device 120.

Illustratively, the liter flow signal on lead 77 is assumed to be +8 volts when a zero liter flow signal is generated across resistor 3 of the minute volume indicator. Under such circumstance, the low limit detector is adjustable to detect zero liter flow without causing an audible alarm to be produced by alarm device 120. Accordingly, wiper 96 of potentiometer 21 is adjusted to set a low liter flow limit which illustratively produces approximately +7.5 volts at base 90 to reverse bias transistor 86 and thereby to retain transistor 100 reverse biased in cooperation with transistors 101 and 102. Similarly, the high limit detector is adjustable to detect zero liter flow without causing an audible alarm to be produced by alarm device 120. To do so, potentiometer 113 is adjusted to set a high liter flow limit which illustratively produces approximately 8.5 volts at the base 106 to forward bias transistor 102 and thereby retain its emitter 104 at slightly less than +10 volts. The latter voltage reverse biases transistor 101 and retains transistor 100 reversed biased.

A low limit liter flow above zero flow and illustratively corresponding to a midscale L of meter 2 is controllably established by adjusting potentiometer 21. By way of example, a liter flow corresponding to midscale L on meter 2 results in a +9 volt signal on conductor 77. Accordingly, a low limit adjustment of potentiometer 21 produces approximately +8.7 volts at the base 90 of transistor 86. As a result, transistor 86 remains reverse biased as long as the monitored liter flow is above the low limit and accordingly the signal on lead 77 remains above +9 volts. The latter signal, when +9 volts or above, maintains the emitter 88 at greater than +8.7 volts to reverse bias transistor 86. When the monitored liter flow falls below the set lower limit, the voltage at emitter 88 is reduced below +8.7 (as a result of less than +9 volts on transistor 85) for causing the emitter 88 to base 90 of transistor 86 to be forward biased. The latter action causes the voltage at collector 92 to be driven toward ground and such voltage is conveyed over conductor 97 and through diode 98 to base 99 of transistor 100 for forward biasing its emitter 119 to base 99 so that collector 118 delivers current for activating the audible alarm device 120.

Accordingly, it is apparent that the alarm equipment according to our invention is settable to upper and lower limits for defining a range of monitored air or gas flow measured by the minute volume indicator 1. The invention is further arranged to detect excursions of the monitored flow outside of the defined range and then to provide automatically a humanly detectable alarm condition.

It is to be understood that the hereinbefore described arrangements are illustrative of the principles of our invention. Numerous other arrangements may be devised by those skilled in the art without departing from the spirit and scope of our invention.

An upper limit liter flow illustratively at a meter 2 scale point H above the lower limit L is controllably established by potentiometer 113. A liter flow corresponding to point H on meter 2 results in a +10 volt signal on conductor 77. Thus, an upper limit adjustment of potentiometer 113 produces approximately +9.5 volts at the emitters 104 and 103 of transistors 102 and 101. Accordingly, transistor 102 remains forward biased as long as the monitored liter flow is below the upper limit and thereby produces a signal on lead 77 which remains below approximately +9.8. The latter signal, when less than about +9.7 volts, maintains the emitter 103 to base 105 junction reverse biased. When the monitored liter flow rises above the set upper limit, the voltage at base 105 is increased more positive than the emitter 103 for causing transistor 101 to be forward biased. The latter action causes the voltage at collector 107 to be driven toward ground and such voltage is conveyed over conductor 116 and through diode 117 to base 99 of transistor 100 for forward biasing its emitter 119 to base 99 so that collector 118 delivers current for activating the audible alarm device 120.

What is claimed is:

1. In equipment for measuring fluid flow parameters and for use in combination with a minute volume indicator having therein electrical signals which are the analog of the minute volume of fluid flow, means for monitoring said fluid parameters comprising a high input impedance monitor amplifier including a field effect transistor differential amplifier for sensing and translating the analog signals and means including a pair of cascaded differential amplifiers for amplifying the signals translated by said monitoring amplifier, means responsive to the deviations of said monitored fluid parameters from a prescribed range of values for automatically supplying an alarm condition and comprising low and high limit detectors concurrently responsive to said translated signals and an alarm amplifier for activating an alarm device, the output of said detectors being coupled to the input of said alarm amplifier, said low limit detector being responsive to deviations below the lower limit of said range to activate said alarm amplifier and said alarm device, and said high limit detector being responsive to deviations above the upper limit of said range to activate said alarm amplifier and said alarm device, a buffer amplifier comprising a Darlington-pair transistor amplifier interposed between said amplifier means and said detectors for providing a low output impedance to the input of said detectors, said low limit detector comprises a differential amplifier having one of its inputs controllably fixed at a voltage corresponding to the lower limit of said range and its other input connected to the output of said Darlington amplifier, and said high limit detector comprising a differential amplifier having one of its inputs controllably fixed at a voltage corresponding to the upper limit of said range and its other input connected to the output of said Darlington amplifier.

2. The invention of claim 1 wherein said alarm amplifier comprises a transistor having emitter, base and collector regions, impedance means in the collector circuit of said transistor, an alarm device connected in parallel with said impedance means, means for reverse biasing said emitter-base regions in the quiescent state of said amplifier, diode means separately coupling the outputs of said low and high limit detectors to said base region, said emitter-base region being forward biased when either of said detectors detects a deviation outside of said range, thereby to activate said alarm device.